United States Patent
Oksman

(10) Patent No.: US 7,974,301 B2
(45) Date of Patent: Jul. 5, 2011

(54) ADAPTIVE NETWORK TO DYNAMICALLY ACCOUNT FOR HIDDEN NODES

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 12/711,874

(22) Filed: Feb. 24, 2010

(65) Prior Publication Data

US 2010/0150167 A1 Jun. 17, 2010

Related U.S. Application Data

(63) Continuation of application No. 11/835,989, filed on Aug. 8, 2007, now Pat. No. 7,756,151.

(60) Provisional application No. 60/950,037, filed on Jul. 16, 2007.

(51) Int. Cl.
*H04L 12/43* (2006.01)
*H04J 3/16* (2006.01)

(52) U.S. Cl. ........................ 370/437; 370/458

(58) Field of Classification Search .......... 370/229–231, 370/235, 400, 431, 437, 438, 458
See application file for complete search history.

(56) References Cited

U.S. PATENT DOCUMENTS

| | | | |
|---|---|---|---|
| 5,241,541 A | 8/1993 | Farrell et al. | |
| 5,648,958 A * | 7/1997 | Counterman | 370/458 |
| 6,791,968 B2 | 9/2004 | Kotzin | |
| 7,099,346 B1 | 8/2006 | Kanterakis | |
| 2004/0018839 A1* | 1/2004 | Andric et al. | 455/433 |
| 2004/0228352 A1 | 11/2004 | Constantinof | |
| 2005/0013247 A1* | 1/2005 | Sipola et al. | 370/230 |
| 2005/0058151 A1* | 3/2005 | Yeh | 370/445 |
| 2005/0117530 A1 | 6/2005 | Abraham et al. | |
| 2005/0170841 A1* | 8/2005 | Sagfors | 455/453 |
| 2006/0019662 A1* | 1/2006 | Andrews et al. | 455/435.3 |
| 2006/0050740 A1* | 3/2006 | Hsu et al. | 370/477 |
| 2007/0026794 A1* | 2/2007 | Ayyagari et al. | 455/11.1 |
| 2007/0061433 A1* | 3/2007 | Reynolds et al. | 709/223 |
| 2008/0144493 A1* | 6/2008 | Yeh | 370/230 |

OTHER PUBLICATIONS

"HomePlug AV White Paper", HomePlug Powerline Alliance, Inc., Document Version No. HPACQWP-050818, Copyright 2005, 11pgs.
U.S. Appl. No. 11/835,959, filed Aug. 8, 2007 from Oksman entitled "Adaptive Network to Dynamically Account for Hidden Nodes" p. 1-31.
U.S. Appl. No. 11/825,972, filed Aug. 8, 2007 from Oksman entitled "Adaptive Network to Dynamically Account for Hidden Nodes" p. 1-31.
Office Action dated Jun. 1, 2009 in connection with USPTO U.S. Appl. No. 11/835,959.
Office Action dated Sep. 3, 2009 in connection with USPTO U.S. Appl. No. 11/835,972.

(Continued)

*Primary Examiner* — Chi H Pham
*Assistant Examiner* — Robert Lopata
(74) *Attorney, Agent, or Firm* — Eschweiler & Associates, LLC

(57) ABSTRACT

One embodiment of the present invention relates to a network element that is configured to be associated with a network having a number of nodes. The master node is configured to communicate with a number of nodes and allocate bandwidth therebetween by sending outgoing signals and receiving incoming signals over a transmission medium. The master node is further configured to adaptively account for hidden nodes with which the master node cannot bi-directionally directly communicate by communicating at least one signal with at least one proxy node. Other methods and network elements are disclosed.

9 Claims, 9 Drawing Sheets

OTHER PUBLICATIONS

Notice of Allowance dated Jan. 6, 2010 issued to U.S. Appl. No. 11/835,959.
Office Action dated Jun. 2, 2009 Issued to U.S. Appl. No. 11/835,989.
Office Action dated Dec. 24, 2009 Issued to U.S. Appl. No. 11/835,989.

* cited by examiner

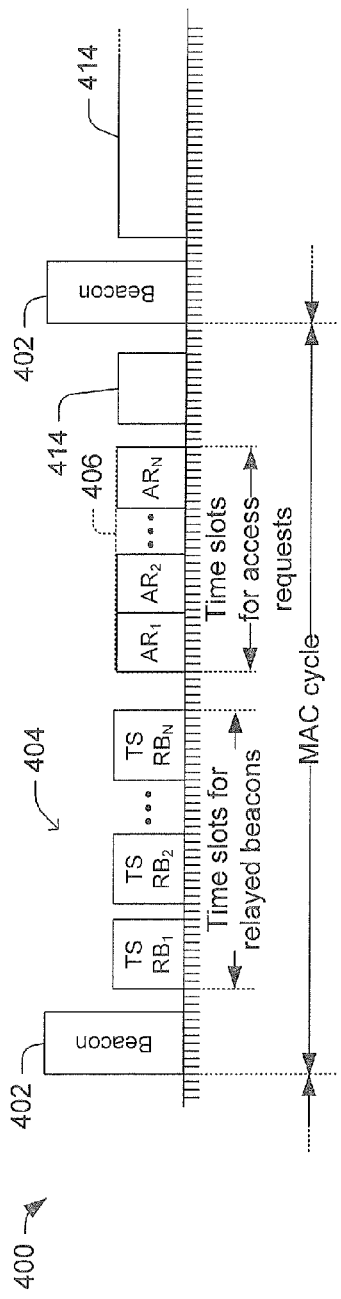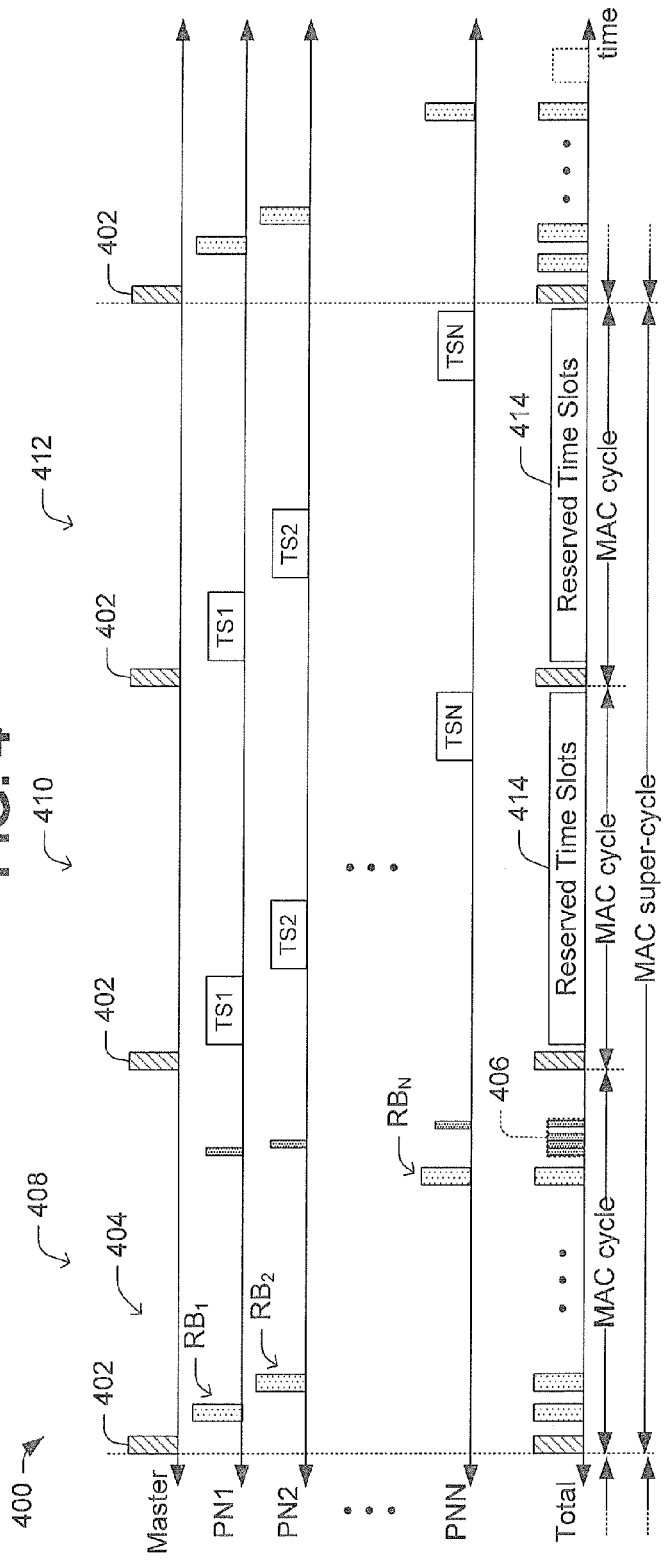
FIG. 4
FIG. 5

US 7,974,301 B2

ADAPTIVE NETWORK TO DYNAMICALLY ACCOUNT FOR HIDDEN NODES

REFERENCE TO RELATED APPLICATIONS

This application is a continuation of U.S. Utility application Ser. No. 11/835,989, filed Aug. 8, 2007, the contents of which are herein incorporated by reference in their entirety, which claims the benefit of U.S. Provisional Application No. 60/950,037, filed Jul. 16, 2007 the contents of which are herein incorporated by reference in their entirety.

FIELD OF INVENTION

The present invention relates to generally to communication networks and more particularly to adaptive communication networks.

BACKGROUND

In today's business climate, industry fortunes rise and fall on whether information is exchanged in an efficient manner. For example, cell phones, pagers, and the Internet have thrived because each technology allows businesses to exchange information over a network. Therefore, to satisfy our society's need for efficient exchange of information, there is an on-going need for improvements in networks.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a network element that is configured to be associated with a network having a number of nodes. The master node is configured to communicate with a number of nodes and allocate bandwidth therebetween by sending outgoing signals and receiving incoming signals over a transmission medium. The master node is further configured to adaptively account for hidden nodes with which the master node cannot bi-directionally directly communicate by communicating at least one signal with at least one proxy node. Other methods and network elements are disclosed.

The following description and annexed drawings set forth in detail certain illustrative aspects and implementations of the invention. These are indicative of but a few of the various ways in which the principles of the invention may be employed.

FIGURES

FIG. 4 shows one embodiment of an access cycle during which a hidden node can request access to the network;

FIG. 5 shows one embodiment of an access super-cycle during which a hidden node can request access to the network;

DETAILED DESCRIPTION OF THE INVENTION

Figure 1:
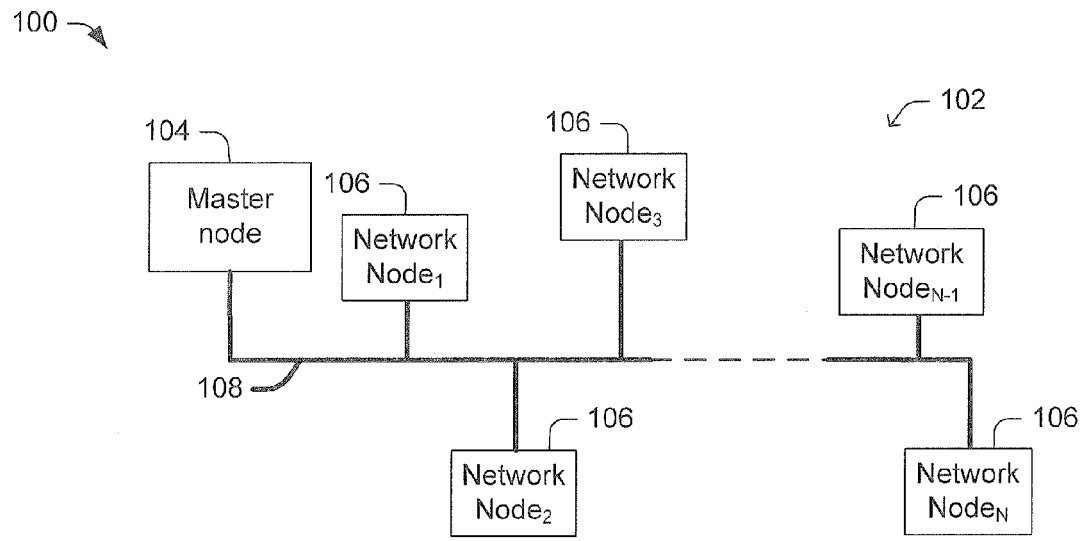
FIG. 1 illustrates one embodiment of a network that transmits data over a transmission medium between nodes of the network.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

FIG. 1 illustrates one network 100 that comprises several nodes 102. In one embodiment in this network 100 could be a home network that distributes broadband services over the customer's residence. As shown, the network includes two types of nodes 102, namely a master node 104 and network nodes 106. These nodes are coupled to a transmission medium 108 over which they send and receive signals. Depending on the implementation, the transmission medium 108 could be either a wireless transmission medium or a wireline transmission medium (e.g., coaxial cable, twisted pair of copper wires, power line wiring, optical fiber, etc.)

In one embodiment, the master node 104 is an access point of the home network, such as a residential gateway that receives broadband services from another network. The network nodes 106 could be connected to other digital content sources at the customer premises, such as a digital video recorder (DVR), a computer providing streaming video, TVs, entertainment centers, etc.

Because the master node 104 and the network nodes 106 share the same transmission medium 108, which can only support up to some maximum total bandwidth, the total amount of information that can be transmitted per unit time over the network is limited. Therefore, to ensure the network nodes have sufficient bandwidth for their respective applications (e.g., IP TV, streaming video, etc.), communication among the nodes must be properly structured. One consideration in structuring this communication is avoidance of signal interference.

One common type of signal interference is collision-interference, which can occur when two different nodes transmit their signals at the same time, causing their signals to "collide" in the transmission medium 108 and erase each other. For example, if a network node is running an IP TV application where signals are sent as packets of data, if another node transmits a signal at the same time the packet is transmitted, the packet may be lost, causing "jitter" on the TV screen.

To structure communication to avoid collisions, the master node 104 is typically responsible for managing communications within the network. For example, by regulating admission of network nodes 106 to the network, the master node can keep track of the nodes associated with the network as well as the quality of service (QoS) requirements for the applications associated with those nodes. The master node can also enforce security policies to prevent alien nodes from being admitted to the network.

Figure 2:
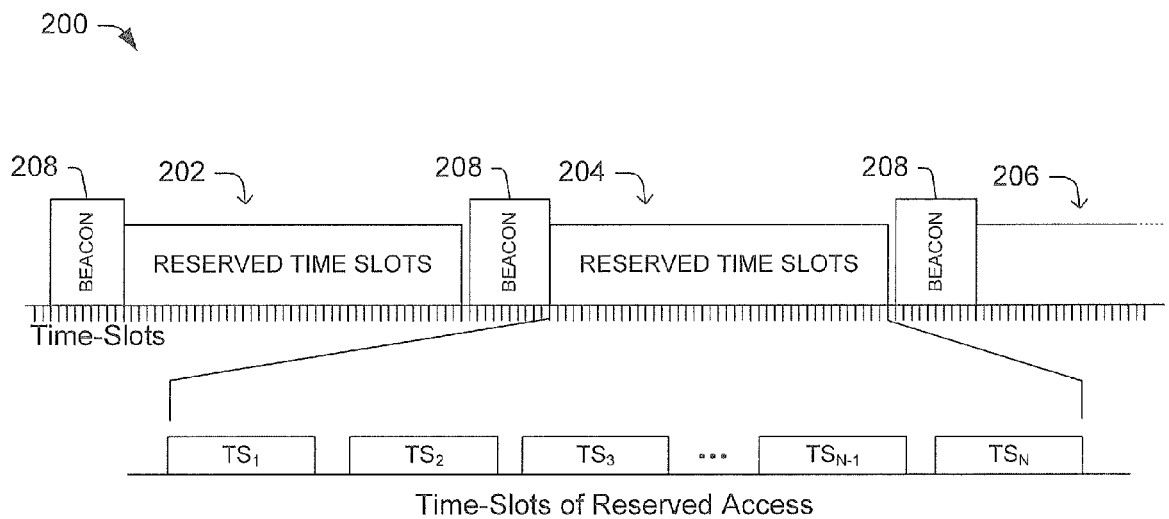
FIG. 2 shows one embodiment of a series of access cycles to communicate between nodes of the network.

The master node can further manage communication within the network by dividing the communication stream into media access cycles (also sometimes referred to as "MAC cycles"). FIG. 2 shows one protocol 200 that includes access cycles 202, 204, 206. A beacon signal 208 may indicate the start of each media access cycle. In this implementation, within each access cycle the master node 104 will assign a unique timeslot to each network node 106 that the master node has admitted to the network. For example, NetworkNode$_1$ could be assigned the first reserved time slot TS$_S$, NetworkNode$_2$ could be assigned the second reserved time slot TS$_2$, NetworkNode$_3$ could be assigned the third reserved time slot TS$_3$, and so on. During each network node's assigned timeslot, the relevant network node can transmit signals to the master node while the other network nodes carry on limited communication so as not to interfere with the transmitting network node. Although the other network nodes could be silent during this timeslot, they may still be able to receive signals from the master node or the transmitting network node. In this way, each network node can transmit its required data without interfering with other network nodes' communication. In some cases, mutual interference may be acceptable between some nodes (e.g., because services communicated via these nodes are insensitive to delays or delay variations), and these nodes may share the same time interval.

To initially assign time slots to the nodes, the master node 104 transmits the beacon signal 208 from time to time. The beacon signal 208 may include a media access plan (MAP) that specifies which network nodes are to be associated with which transmission time slot(s) during a given media access cycle as well as the boundaries of the access cycle. The beacon signal 208 may be transmitted from time to time as needed to update the MAP, or may be transmitted periodically.

While this implementation is relatively effective, it has several shortcomings. For example, the implantation does not provide a manner in which new nodes can be dynamically admitted to the network. For example, in a home network, if a user adds a new DVR to his system, the master node needs to re-calculate the whole MAP to efficiently admit this new DVR to the network. Second, the implementation does not account for hidden nodes, which are positioned such that they cannot receive the beacon signal and the MAP communicated by the master node at a given time. Hidden nodes could arise, for example, due to high attenuation or high levels of noise in the system. Hidden nodes could be nodes that are unable to communicate with the master node to initially join the network, or could be network nodes that were once admitted to the network but which have become hidden due to a change of channel characteristics between network nodes. Such a change could happen when one of the nodes is disconnected or a new node is connected to the network. If the network could account for these hidden nodes, the network could increase its service area.

Figure 3:
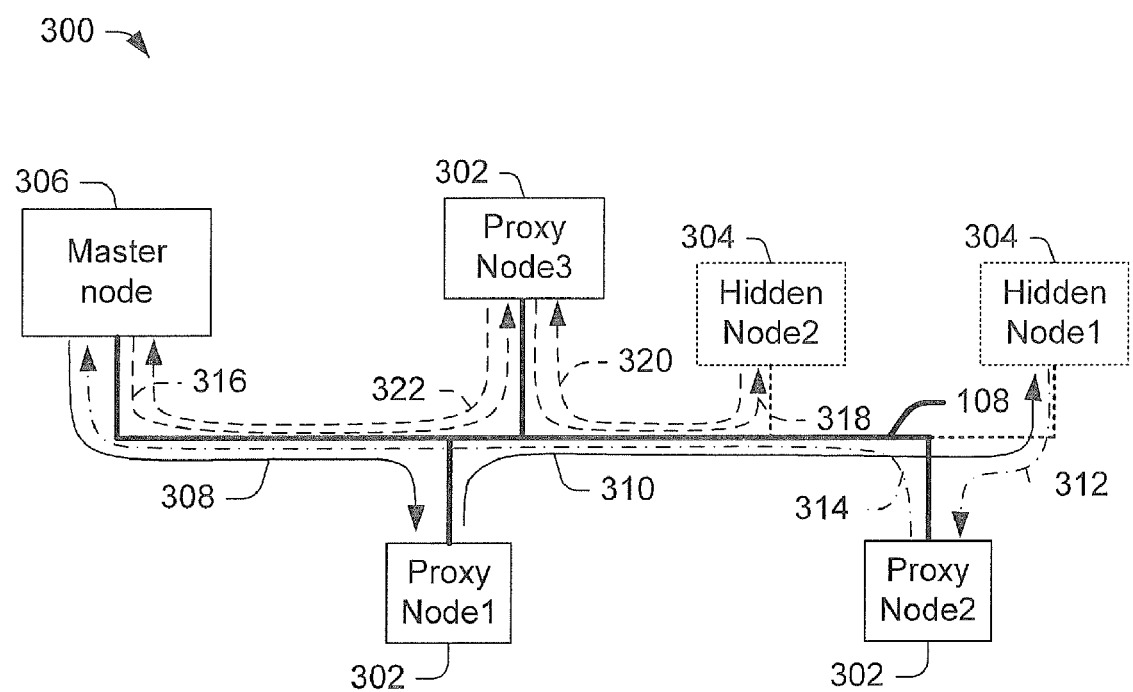
FIG. 3 illustrates one embodiment of a network that includes a hidden node.

FIG. 3 shows an embodiment of a network 300 that may remedy these and other shortcomings. In this network 300, admitted nodes could communicate with one another directly (peer-to-peer mode) or via the master node (centralized mode), depending on the implementation. Thus, although the illustrated protocols below show the master node delivering beacon signals and managing communication between the nodes, it will be appreciated that as a practical matter the master node may also have functionality to transmit data to individual nodes and receive data from individual nodes during suitably assigned timeslots (which are not shown for purposes of clarity). In some ways, network 300 may include nodes that function similarly to the nodes previously discussed with reference to FIG. 1-2 and associated text. However, network 300 also includes other nodes (referred to as proxy nodes 302) that act as relay stations between a hidden node 304 and a master node 306. The proxy nodes 302 typically have a stable connection with both the master node 306 and a hidden node 304, and can relay signals coming from the hidden node 304 to the master node 306, and vice versa.

Depending on the scenario, one or more proxy nodes 302 may be used to communicate signals between a hidden node 304 and the master node 306. For example, HiddenNode1 uses two proxy nodes to communicate with the master node. More specifically, if the master node 306 sends a signal 308 to ProxyNode1, which may also be referred to as a transmit relay node (TX_relay node), ProxyNode1 can then relay the signal 310 (or a derivative thereof) across the transmission medium. If HiddenNode1 receives this relayed signal 310, HiddenNode1 could analyze the signal and determine a suitable proxy node to respond to. Based on the relayed signal 310 or another relayed signal from ProxyNode2 (not shown), HiddenNode1 could then send a response signal 312 to ProxyNode2, which may also be referred to as a receive relay node (RX_relay node). ProxyNode2 will relay the respond from HiddenNode1 and transmit the relayed signal 314 to the master node 306. Thus, HiddenNode1 illustrates a general case where a hidden node uses two different proxy nodes (i.e., a TX_relay node and an RX_relay node) to communicate with the master node 306.

FIG. 3 also illustrates a more specific scenario where HiddenNode2 uses a single proxy node, ProxyNode3, to communicate with the master node 306. As shown, if the master node sends a signal 316 to ProxyNode3, ProxyNode3 relays a signal 318 to HddenNode2. If HiddenNode2 responds by sending a signal 320, ProxyNode3 then relays the signal 322 to the master node 306. In essence, Hidden Node2 shows a specific example where the TX_relay node and RX_relay node constitute a single node.

To ensure that a hidden node requesting access to the network does not transmit a signal during an admitted node's reserved time slots thereby causing collisions, a suitable signaling protocol should be used in this network 300. Several illustrative signaling protocols are now discussed. The various components of the network 300 and other systems of the invention include suitable circuitry, state machines, firmware, software, logic, etc. to perform the various methods and functions illustrated and described herein, including but not limited to the methods described below. While the methods illustrated below are illustrated and described as a series of signal patterns, acts, or events, it will be appreciated that the present invention is not limited by the illustrated ordering of such signal patterns, acts, or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of networks which are illustrated and described herein (e.g., network 300 in FIG. 3) as well as in association with other systems not illustrated, wherein all such implementations are contemplated as falling within the scope of the present invention and the appended claims.

FIGS. 4-5 show one signaling protocol 400 in accordance with aspects of the present invention. Generally speaking, FIG. 4 shows a single access cycle ("MAC cycle"), while FIG. 5 shows thee consecutive access cycles that make up a super-access cycle ("MAC super-cycle"). Although FIG. 5 shows a super-access cycle that includes three access cycles, other super-access cycles could include any number of access cycles.

In the illustrated signaling protocol 400, when a node powers up, it will try to join the network 300 while at the same time avoiding interference. To achieve this functionality, the node listens to the transmission medium and tries to detect a beacon signal 402 that indicates the start of an access cycle. This beacon signal 402 could be transmitted by the master node and typically includes a MAP, as previously discussed (e.g., in FIG. 2 and associated text). If the node can detect the beacon signal, the node will determine the time slot reserved for admission requests (AR) based on the MAP. During this reserved time slot, the node can transmit an admission request to the master node.

If the node is a hidden node, however, it may be unable to receive the beacon signal and associated MAP directly from the master node or may be unable to successfully transmit an admission request to the master node. Therefore, FIG. 4's access cycle includes N relayed beacon timeslots 404 ($TSRB_1$, $TSRB_2$, $TSRB_3$, ..., $TSRB_N$), where each network node and/or proxy node transmits a corresponding relayed beacon signal ($RB_1$, $RB_2$, ..., $RB_N$) during a respective relayed beacon time slot. These relayed beacons may allow the hidden nodes to properly align their communications over the network, despite that the hidden nodes may be unable to bi-directionally directly communicate with the master node. It is substantial that each relayed beacon is transmitted in a separate time slot to avoid collision between them.

Often, each relayed beacon signal ($RB_1$, $RB_2$, ..., $RB_N$) includes its own relayed media access plan ($RMAP_1$, $RMAP_2$, ..., $RMAP_N$, respectively) and may have a predetermined bit identifier that allows nodes to unambiguously distinguish between the beacon signal and a relayed beacon signal. Each RMAP could include similar information as the MAP, and will in some manner notify a hidden node of when the admission request timeslot occurs. This could be done, for example, by referencing the time shift between the beacon signal and the respective relayed beacon. Each RMAP could also carry a node identifier (node ID) of the node/proxy that relayed the beacon signal. For example, this node ID could be an 8-bit field, or some other size field that allows a sufficient number of nodes to be admitted to the network.

Therefore, if a hidden node can receive one or more of the relayed beacon signals, the hidden node can analyze the RMAP and determine the time slot reserved for admission requests 406. During this timeslot 406, the master node and all nodes associated with the network could carry on limited communication so as not to cause interference with the admission requests. The hidden node could then send an admission request during the admission request time slot 406, by using the node ID of the node/proxy that it determines is best suited to relay its admission request. By making an admission request during the proper time slot through an admitted proxy node, the hidden node can avoid potential signal collisions with the other nodes applying for access at the same MAC cycle.

As shown, the admission request time slot 406 may be sub-divided such that each proxy node has a timeslot therein. Thus, each proxy node may receive an admission request from a hidden node and relay the request to the master node within the particular proxy node's timeslot within the access timeslot 406. For example, ProxyNode1 (PN1) could relay an admission request to the master node from a hidden node within admission request timeslot AR1, or the hidden node could make an admission request directly to the master within timeslot AR1. In another embodiment, a common admission request interval is assigned for all nodes in assumption that the case when more than one node seeks access at the same time is rare; in case of collision, both nodes will apply for access again later with relevant time back-off.

In FIG. 5's illustrated embodiment, N relayed beacons are transmitted within the first access cycle 408. Here N corresponds to the number of proxy nodes (PN1, PN2, ..., PNN) and network nodes currently admitted to the network, where the network nodes can be potentially used as proxy nodes. Thus, each proxy node and each network node which potentially can be used as a proxy could transmit a relayed beacon during its assigned relayed beacon time slot, and the other nodes are quiet during this time slot. All nodes are typically quiet during the beacon signal 402 transmitted by the master node.

To limit the amount of bandwidth consumed by admission requests, the super-cycle also includes access cycles 410, 412 that have timeslots reserved for communication 414 (e.g., data transfer) between the admitted nodes. These access cycles 410, 412 may be dedicated entirely to communication between admitted nodes and may not include any relayed beacon signals. The number of the access cycles dedicated entirely to communication in the access super-cycle can be any, but with more of these cycles the average time for a node to access the network will be longer.

Figure 6:
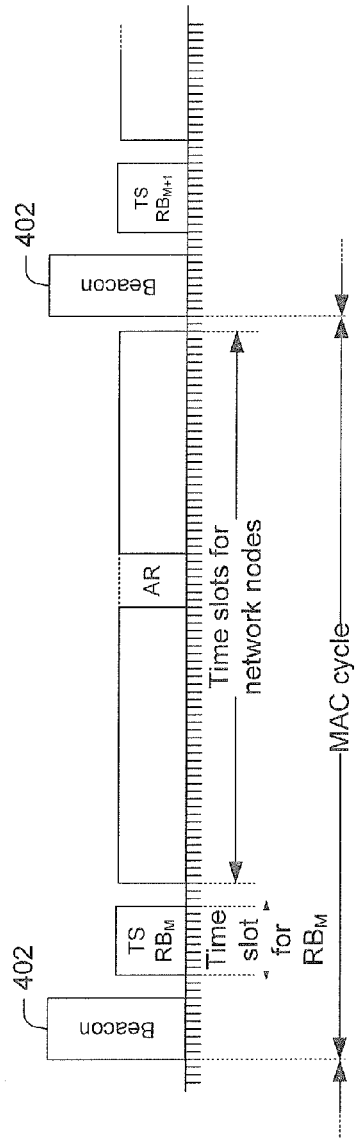
FIG. 6 shows one embodiment of an access cycle during which a hidden node can request access to the network.
Figure 7:
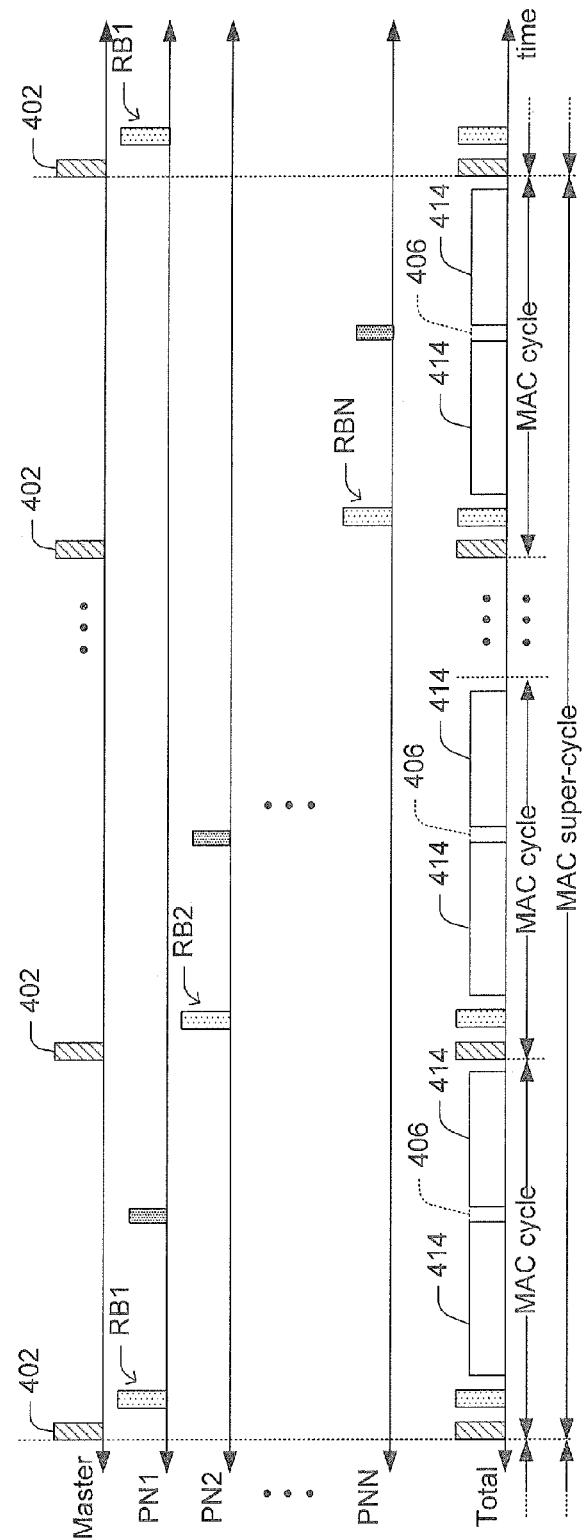
FIG. 7 shows one embodiment of an access super-cycle during which a hidden node can request access to the network.

FIG. 6-7 show another embodiment of an access cycle (FIG. 6) and access super-cycle (FIG. 7) that could be used. In this protocol 600, a given access cycle includes only one relayed beacon time slot. The majority of the access cycle is reserved for communication with the network nodes. Some of the remaining time slots of the access cycle are reserved for receiving admission requests.

As shown in FIG. 7, the access cycles within the access super-cycle are arranged such that each access cycle includes a relayed beacon originating from a different proxy or network node. Thus, the number of access cycles in the access super cycle should be equal to or exceed the number of proxy nodes plus the number of nodes which potentially can be used as a proxy associated with the master node, such that each of these nodes transmits a relayed beacon during a different access cycle. In some embodiments, the access cycle could also include additional access cycles in which no relayed beacons are transmitted, but only data is communicated between the admitted nodes and master node.

In other embodiments, there might be more than one relayed beacon timeslot per access cycle. For instance, with two relayed beacon timeslots in each cycle, the two dedicated nodes associated with the cycle will relay the beacon during the access cycle. With total of N proxy nodes and nodes which potentially can be used as proxy nodes, the number of access cycles in an access super-cycle will be N/2.

Thus, it will be appreciated, that nodes can dynamically change their status between network nodes (which often communicate bi-directionally directly with the master), proxy nodes (which typically communicate bi-directionally directly with the master and also relay signals to and/or from hidden nodes), and hidden nodes (which often communicate indirectly with the master node via one or more proxy nodes). Therefore, various nodes within the network could have proper circuitry, software, etc. to function as network nodes, proxy nodes, hidden nodes, and even master nodes, thereby allowing the network to adapt to changes in network configuration.

Figure 8A:
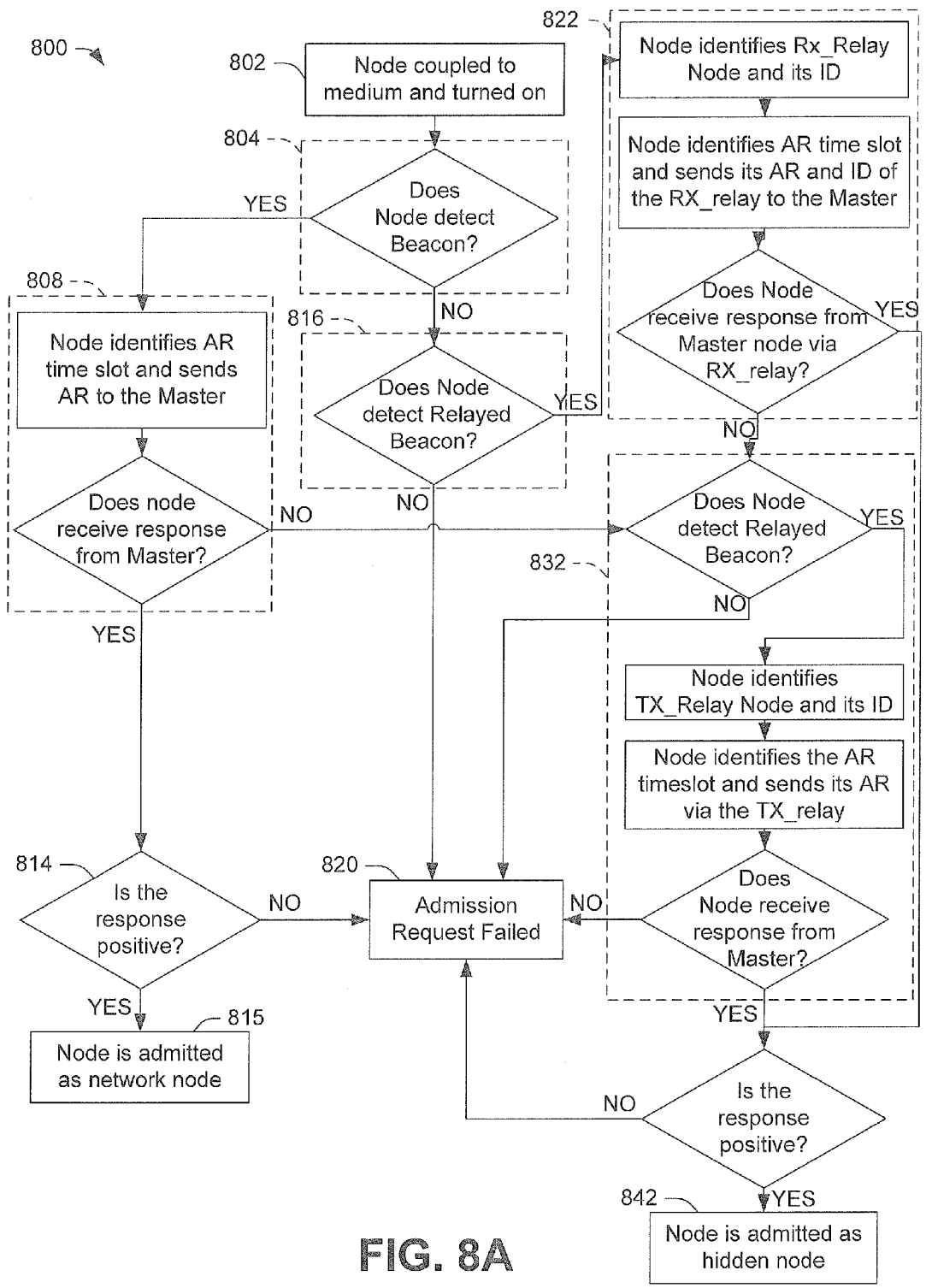
FIG. 8A-8F shows a flowchart and schematic diagrams of a method for adaptive communication.
Figure 8B:
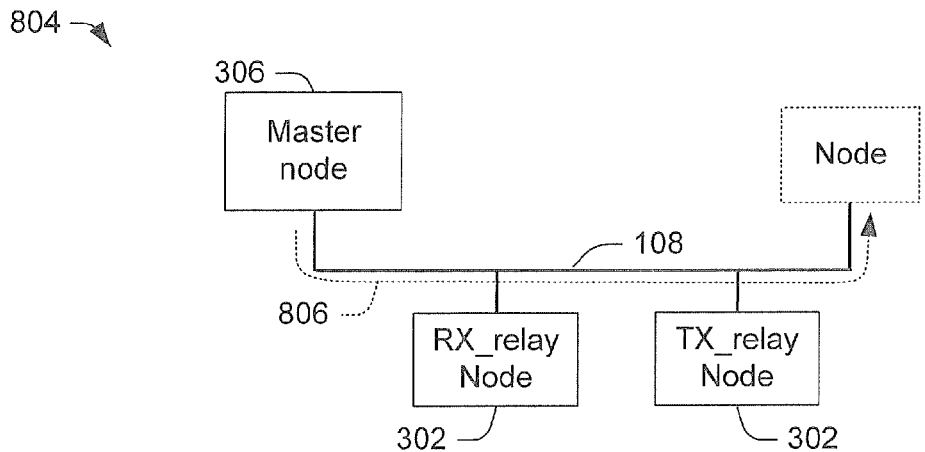

Referring now to FIGS. 8A-8F, one can see a method 800 in accordance with aspects of the invention. FIG. 8A shows a flowchart, while FIGS. 8B-8F show schematic representations of a network during various stages of the flowchart 800. The method illustrates one method that a node can carry out to initially access the network. Generally speaking, this method 800 allows a node seeking access to the network to intelligently check communication over various network paths, such that the node can determine whether direct bi-directional communication or indirect communication with the master node is appropriate.

In block 802, a node that is not yet admitted to the network is coupled to the transmission medium and turned on.

In block 804, the node listens to the transmission medium and attempts to receive a beacon signal directly from the master node. In one embodiment, this block could correspond to FIG. 8B, where the network node is listening for a beacon signal 806.

Figure 8C:
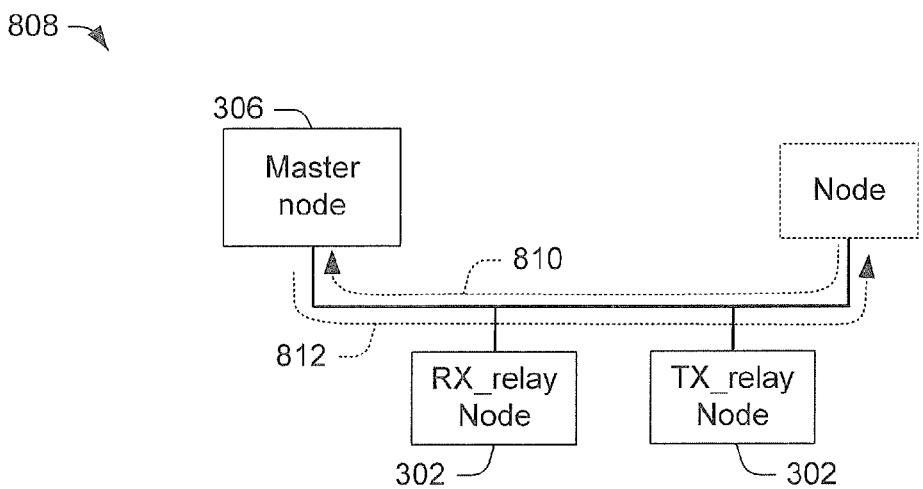
Figure 8D:
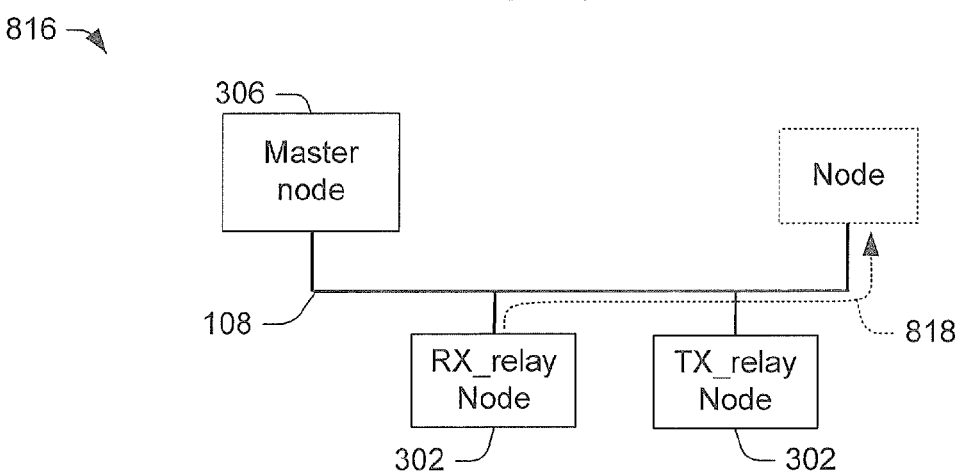
Figure 8E:
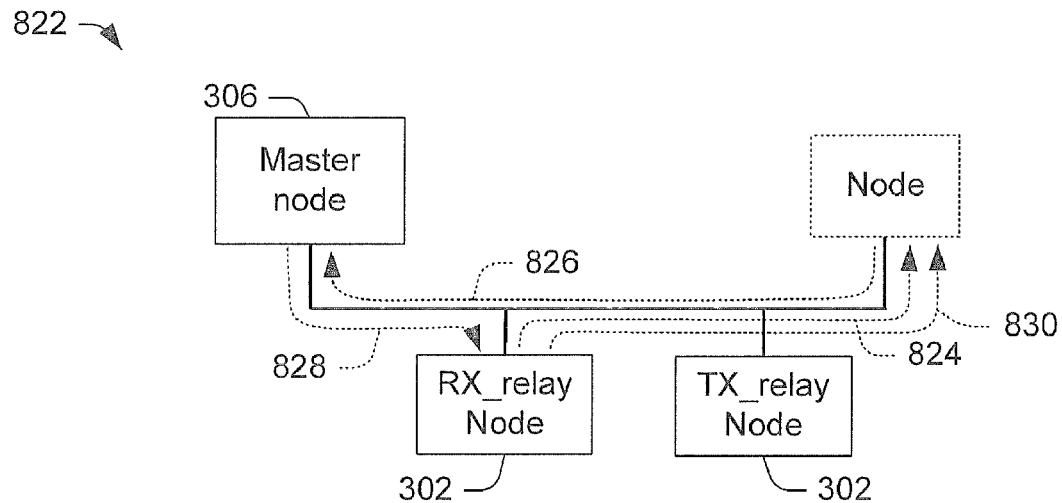
Figure 8F:
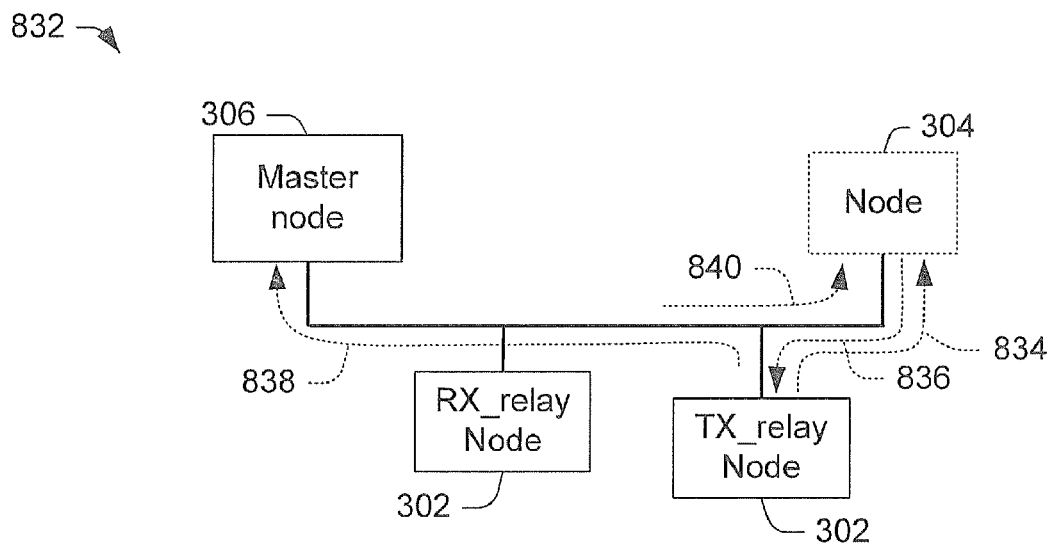

If the node can receive the beacon signal (YES at 804), then the method proceeds to block 808 where the node identifies a proper admission request (AR) time slot and sends an admission request to the master node. Thus, block 808 could correspond to FIG. 8C. In FIG. 8C, the node has sent up to a predetermined number of ARs 810 to the master node. If the node receives a response 812 from the master node (YES at 808), the node can carry on direct bi-directional communication with the master node and may be admitted as a network node. Notably, in block 814 the master node's can exercise discretion as to whether the node is admitted, based on bandwidth requirements for nodes already admitted to the network, signal strength, etc. If the node is admitted as a network node in block 815, the master node may allocate the network node a unique relayed beacon timeslot and its own transmission timeslot (reserved or shared with some other nodes). Thereafter, the node may start communicating with other nodes and transmitting a suitable relayed beacon signal to find other hidden nodes.

If the node cannot receive the beacon signal (NO at 804), then the node will attempt to find a proxy node by which it can receive signals from the master node. Accordingly, the method moves to block 816 where the node attempts to detect at least one relayed beacon transmitted from a node admitted to the network. Thus, block 816 could correspond to FIG. 8D, where the node is attempting to listen for a relayed beacon signal 818 from a suitable RX_relay node. If the node cannot find a suitable RX_relay (NO at 816), the node is unable to detect a beacon signal or a relayed beacon, and the admission request will fail (820).

If the node does detect a suitable relayed beacon, the method progresses to block 822. In one embodiment, block 822 could correspond to FIG. 8E where the node receives a relayed beacon signal 824 from the RX_relay node. Based on the RMAP of the relayed beacon signal, the node attempts to transmit an AR 826 directly to the master node during a proper AR time slot. This AR 826 typically includes the Node ID of the RX_relay. The node can then wait for the master node to use the Node ID to send a AR response 828 to the RX_relay. The RX_relay can then send a relayed AR response 830 to the node.

If the node doesn't receive a response from the master node, for example after some number of attempts (NO at 808) or (NO at 822), the method moves to 832 where the node attempts to use a network node as a TX_relay, to relay the AR to the master node. Depending on whether the method arrives at 832 from 822 or from 806, the TX_relay could at times be used in conjunction with the RX_relay. In one embodiment, block 832 could correspond to FIG. 8F where the node identifies the TX_relay node by detecting a relayed beacon signal 834. Based on the RMAP and the ID of the node in the relayed beacon signal 834, the node then attempts to employ this node as its TX_relay and sends its AR 836 to this TX_relay, which will send the relayed AR 838 to the master node. The node can then wait to receive an AR response 840 from the master node. This AR response 840 could be transmitted directly from the master or could be relayed via the RX_relay.

If the node receives a positive response from the master (YES at 822 or 832), in block 842 the node could be admitted to the network as a hidden node. If the node does not receive a response from the master (NO at 822 or 832), the node could surmise that the admission request has failed (820).

Figure 9:
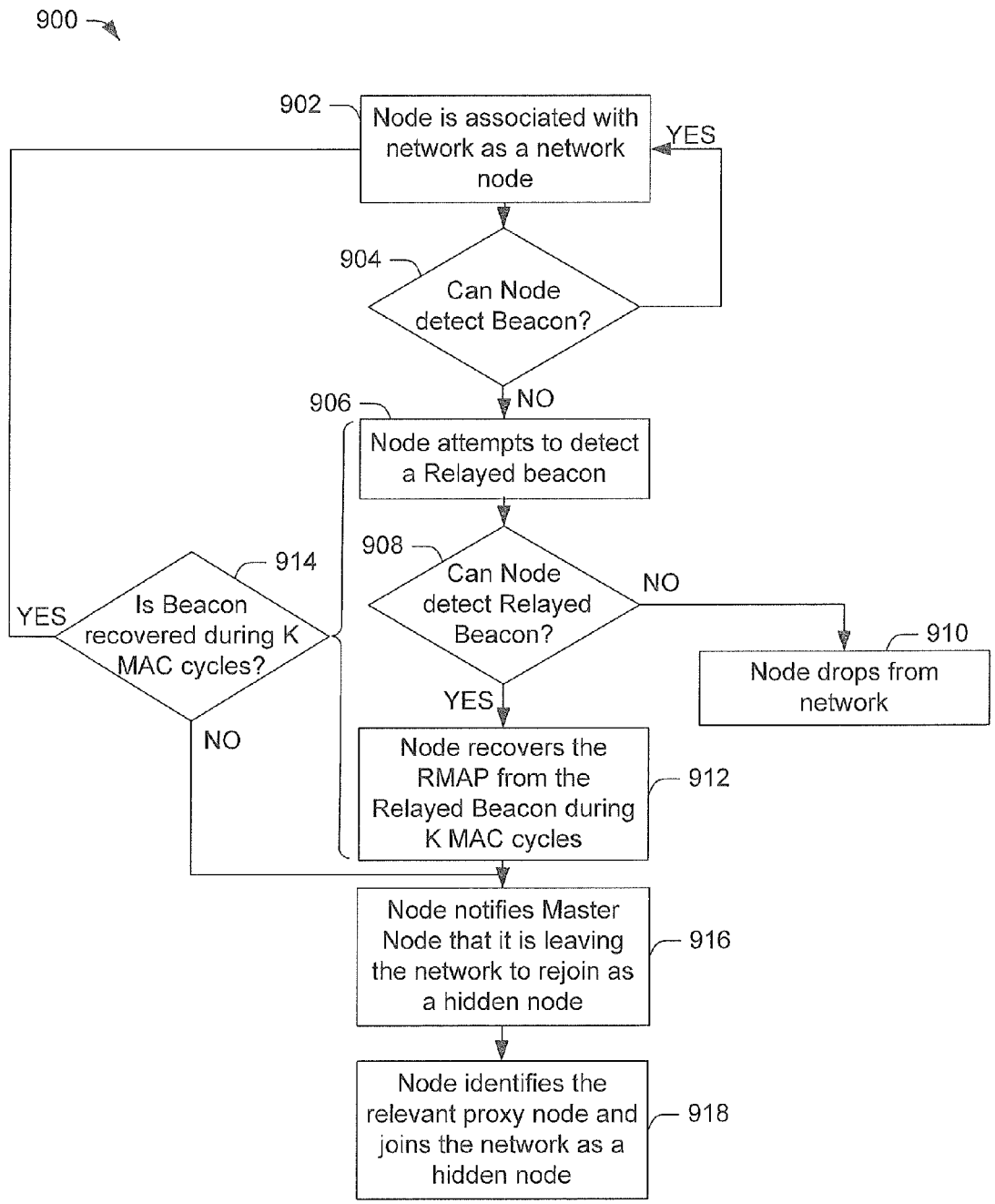
FIG. 9 shows a flowchart of another embodiment of adaptive communication.
Figure 10:
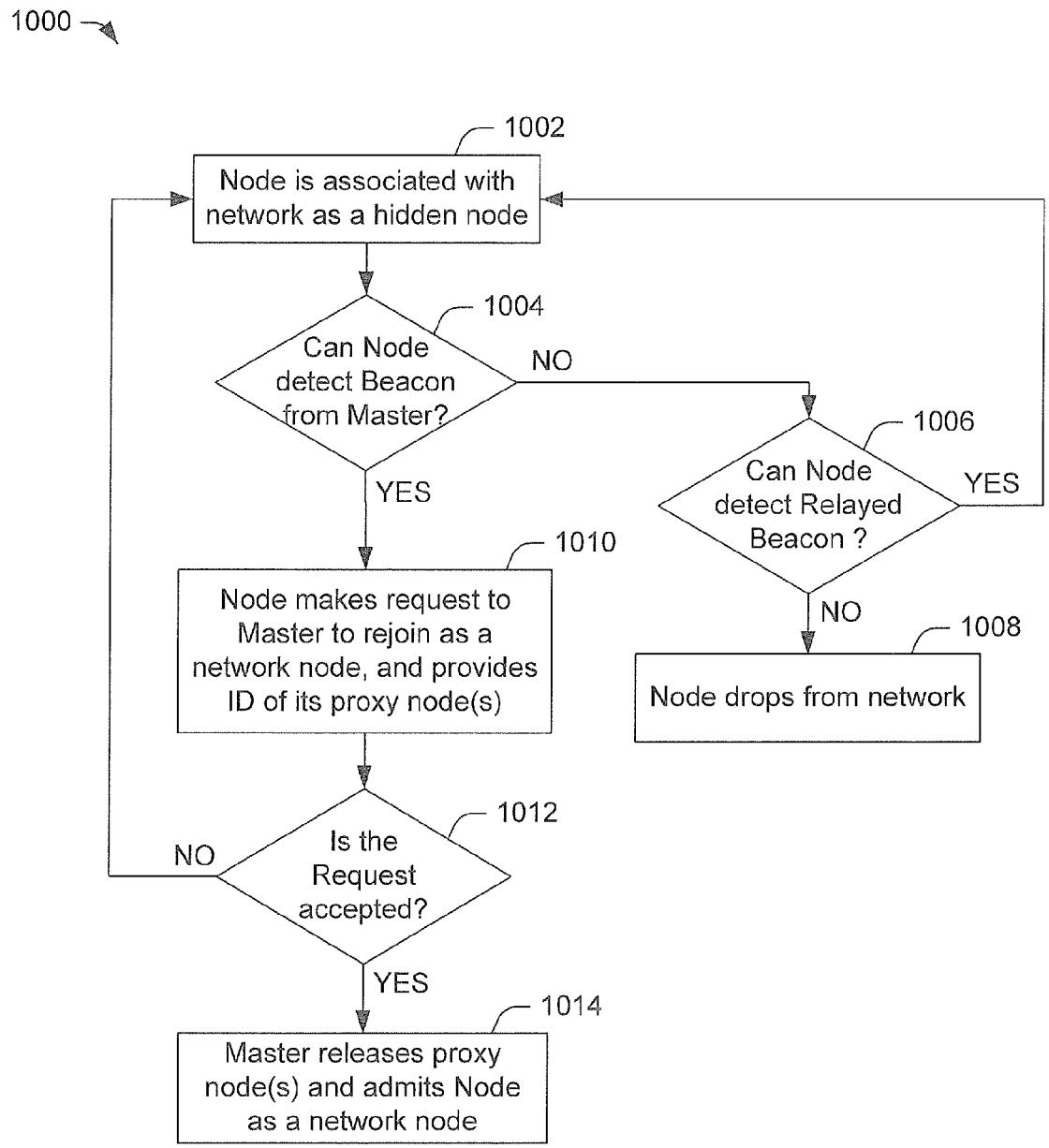
FIG. 10 shows a flowchart of another embodiment of adaptive communication.

Referring now to FIGS. 9-10, one can see some example methods by which a node may transition from being a network node to being a hidden node, and vice versa. In FIG. 9, for example, shows a method 900 where a node can transition from being a network node to being a hidden node.

Method 900 starts at 902 when the node is associated with the network as a network node that bidirectionally communicates directly with the master node. So long as the node can detect the beacon signal (YES at 904), the node keeps its status as a network node. Although not illustrated here, the node may also send relay beacons and connect to hidden nodes (i.e., become a proxy node).

If the node can no longer detect the beacon signal a predetermined number of attempts (NO at 904), in block 906 the node attempts to detect a relayed beacon. If the node cannot detect a relayed beacon within a predetermined number of attempts (NO at 908), the method 900 moves to 910 where the node drops from the network. During the access cycles when no beacon is detected, the node may not be allowed to transmit communication signals to other nodes.

If the node can detect a relayed beacon (YES at 908), in block 912 the node analyzes the RMAP in the relayed beacon to determine a suitable time period in which it can transmit a message to the master node. The node performs this analysis over K (some integer number) of MAC cycles, to ensure that the changes in the network causing the lost beacon are stable. Notably, as indicated by block 914, if the node recovers the beacon signal at any time during blocks 904-912, it may be able to reassociate with the network as a network node, so long as the network association timeout value has not been exceeded.

Assuming the node does not recover the beacon signal within K MAC cycles, the node will assume the lost beacon is a stable condition and, in block 916, the node can attempt to notify the master node that the it is leaving the network to rejoin as a hidden node. In block 918, the node can identify the relavant proxy node(s) (i.e., RX_relay node and/or TX_relay node) and request access to the network as a hidden node.

Referring now to FIG. 10, one can see another method 1000 where a node transitions from being a hidden node to being a network node. Method 1000 starts at 1002, where the node is associated with the network as a hidden node. In block 1004, the node attempts to detect the beacon signal from the master. If the beacon signal cannot be detected (NO at 1004), in 1006 the node ensures that the relayed beacon can still be detected. If the relayed beacon is still detected (YES at 1002), the node stays associated with the network as a hidden node.

If the relayed beacon is not detected in a predetermined number of attempts (NO at 1006), in 1008 the node drops from the network.

If systems conditions change and allow a hidden node to reliably (e.g., in a predetermined number of attempts) detect the beacon signal (YES at 1004), the method moves to 1010 where the node transmits a request to the Master to rejoin the network as a network node. In making this request, the node provides the Master with the IDs of its proxy node(s).

If the request is accepted (YES at 1012), the method moves to 1014 where the Master node releases the proxy node(s), which become network nodes, and admits the node as a network node. If the request is denied (NO at 1012), the node can stay associated with the network as a hidden node.

While examples of the invention have been illustrated and described with respect to one or more implementations, alterations and/or modifications may be made to the these examples without departing from the spirit and scope of the appended claims. For example, although hidden nodes may be discussed above as being unable to receive a beacon signal or a relayed beacon signal, the concept of hidden nodes could also apply to nodes that do, in fact receive such a signal, but with a relatively poor signal to noise margin. Further, although the term "number" may be used, it will be construed broadly to include any positive integer inclusively ranging from one to practically infinity. In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A network element within a network, comprising:
a master node configured to communicate with a number of nodes that are admitted to the network and further configured to allocate bandwidth among the number of nodes by sending outgoing signals and receiving incoming signals over a transmission medium;
the master node being further configured to provide a beacon signal to the number of nodes, where the beacon signal specifies a number of timeslots during which the number of nodes are to transmit respective signals, where one of the number of nodes acts as a proxy node by transmitting a relayed beacon signal based on the beacon signal to facilitate communication between the master node and a hidden node through the proxy node; where the master node is configured to receive an admission request directly from the hidden node and is further configured to respond to the admission request by transmitting an admission request response to the proxy node to communicate with the hidden node.

2. The network element of claim 1, where the number of relay beacon timeslots are spread over an access super-cycle that comprises a number of access cycles, where at least one pulse of the beacon signal occurs between successive access cycles.

3. The network element of claim 1, where the master node is configured to dynamically add another relay beacon slot as a function of whether the hidden node has made an admission request, where another relay beacon timeslot is reserved for a relayed beacon signal from the hidden node.

4. The network element of claim 1, where the master node is configured to receive a relayed admission request from the proxy node, where the relayed admission request is based at least in part on an admission request transmitted by the hidden node.

5. The network element of claim 4, where the master node is configured to respond to the relayed admission request by transmitting an admission request response directly to the hidden node over the transmission medium.

6. The network element of claim 4, where the master node is configured to respond to the relayed admission request by transmitting an admission request response to a receive relay node that forwards the relayed admission request to the hidden node, where the receive relay node differs from the proxy node.

7. The network element of claim 1, where the network is a home network.

8. The network element of claim 1, further comprising:
analysis circuitry that determines whether a received incoming signal is an admission request transmitted by a hidden node.

9. A network element within a network, comprising:
a master node configured to communicate with a number of nodes that are admitted to the network and further configured to allocate bandwidth among the number of nodes by sending outgoing signals and receiving incoming signals over a transmission medium;
the master node being further configured to provide a beacon signal to the number of nodes, where the beacon signal specifies a number of timeslots during which the number of nodes are to transmit respective signals, where one of the number of nodes acts as a proxy node by transmitting a relayed beacon signal based on the beacon signal to facilitate communication between the master node and a hidden node through the proxy node;
where the master node is configured to receive a relayed admission request from the proxy node, where the relayed admission request is based at least in part on an admission request transmitted by the hidden node,
where the master node is configured to respond to the relayed admission request by transmitting an admission request response to a receive relay node that forwards the relayed admission request to the hidden node, where the receive relay node differs from the proxy node.

* * * * *